United States Patent [19]

Miyasaka

[11] Patent Number: 5,218,590
[45] Date of Patent: Jun. 8, 1993

[54] OPTICAL DISK APPARATUS HAVING IMPROVED RECORDING CAPACITY

[75] Inventor: Toshiyuki Miyasaka, Yokohama, Japan

[73] Assignee: Kabushiki Kaisha Toshiba, Kawasaki, Japan

[21] Appl. No.: 586,281

[22] Filed: Sep. 21, 1990

[30] Foreign Application Priority Data

Sep. 29, 1989 [JP] Japan .................. 1-253949

[51] Int. Cl.$^5$ .............................. G11B 7/00
[52] U.S. Cl. ............................. 369/54; 369/47; 369/32; 369/44.26
[58] Field of Search ............. 369/54, 48, 58, 59, 369/32, 44.26, 33, 275.3, 47

[56] References Cited

U.S. PATENT DOCUMENTS

| | | | |
|---|---|---|---|
| 4,455,635 | 6/1984 | Dieterich | 369/59 |
| 4,734,901 | 3/1988 | Murakami | 369/59 |
| 4,791,622 | 12/1988 | Clay et al. | 369/48 |
| 4,937,804 | 6/1990 | Ishihara | 369/48 |
| 4,986,668 | 1/1991 | Fukushima et al. | 369/59 |

FOREIGN PATENT DOCUMENTS

| | | |
|---|---|---|
| 0242093 | 10/1987 | European Pat. Off. . |
| 0282036 | 9/1988 | European Pat. Off. . |
| 0316867 | 5/1989 | European Pat. Off. . |
| 60-231982 | 11/1985 | Japan . |
| WO85/01380 | 3/1985 | PCT Int'l Appl. . |

Primary Examiner—Aristotelis Psitos
Assistant Examiner—Nabil Hindi
Attorney, Agent, or Firm—Finnegan, Henderson, Farabow, Garrett & Dunner

[57] ABSTRACT

An optical disk apparatus comprises an information generating circuit for inserting a predetermined number of resync codes in information to be recorded to generate record information, an optical disk driver for recording the record information generated by the information generating circuit on a predetermined region on a recording medium, and for reproducing the record information, recorded on the predetermined region on the recording medium by the recording circuit, a control circuit for computing an error ratio of data read out from the recording medium to data to be written, a detecting circuit for detecting the resync codes in the information reproduced by the reproducing circuit, and a counter for counting the resync codes detected by the detector. The control circuit makes the record information record on an interchange region when the error ratio is equal to or greater than a predetermined value or when the error ratio is equal to or less than the predetermined value and the number of the resync codes is equal to or less than a predetermined value.

5 Claims, 5 Drawing Sheets

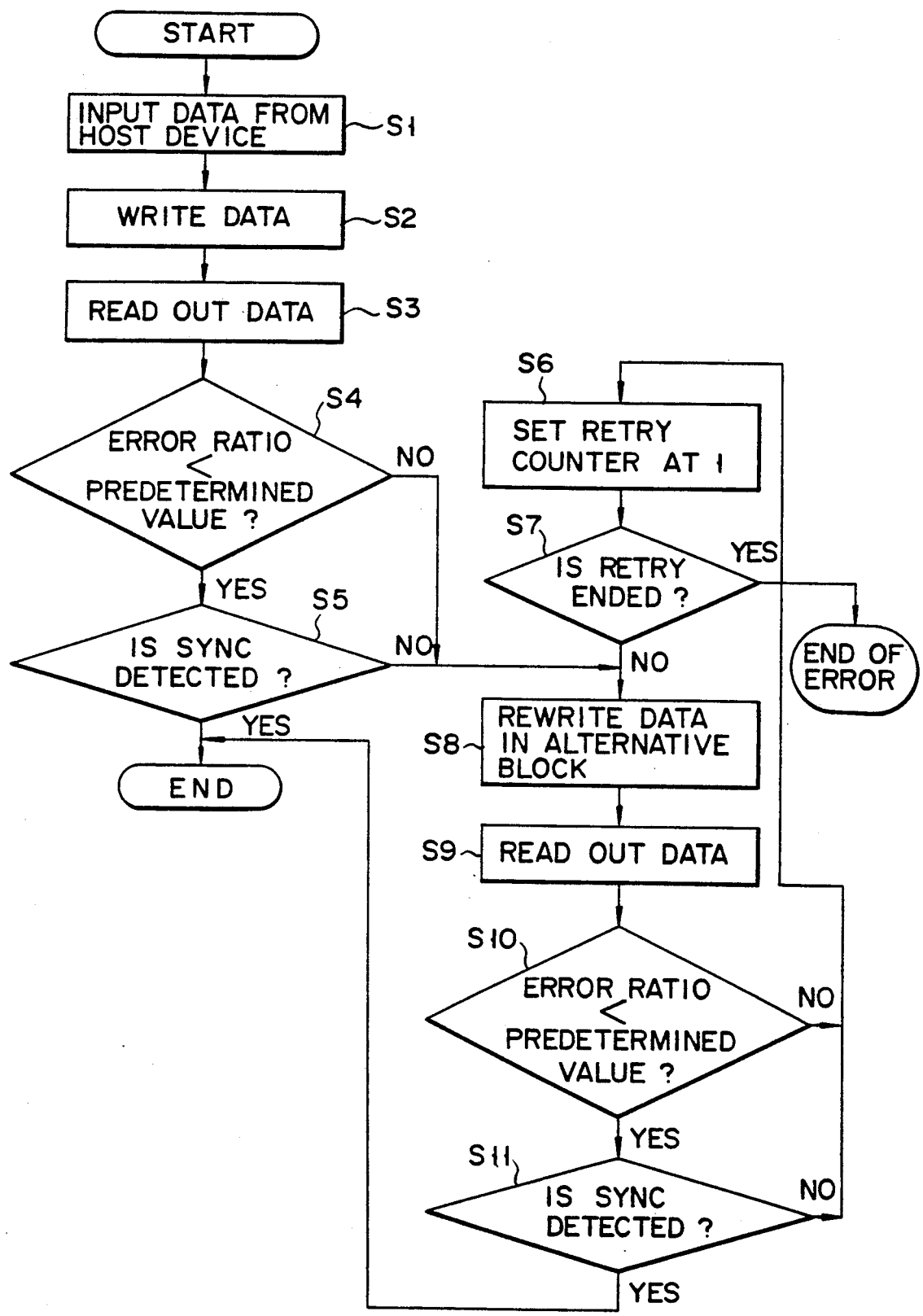
F I G. 5

OPTICAL DISK APPARATUS HAVING IMPROVED RECORDING CAPACITY

BACKGROUND OF THE INVENTION

1. Field of the Invention

The present invention relates to an optical disk apparatus for optically recording information, and, more particularly, to an optical disk apparatus which reliably executes an information interchange process of an optical disk.

2. Description of the Related Art

Conventionally, an information recording/reproduction apparatus for use in an optical disk apparatus for recording information on, and reproducing it from, a data recording medium, such as a rewritable type or WORM (Write once read many) type optical disk, is designed so that an optical head, which is linearly movable in the radial direction of the optical disk by a linear motor, irradiates light on the optical disk for information recording or information reproduction.

According to the prior art optical disk apparatus, a foreign matter stuck on the surface of an optical disk or a scratch made thereon is likely to hinder the proper data recording or reproduction. In such a case, when the optical head accesses to that area where data recording or reproduction is not possible, a so-called information interchange process is carried out to use a proper area instead of the improper area. This information interchange process is executed when "read-after-write" is performed at the time of recording data and a reading ratio (error ratio) at the reading time is equal to or greater than a predetermined value. The "read-after-write" is a temporary reproduction immediately after data recording in order to check if the written data is properly recorded.

When information is recorded on an area where foreign matter is stuck or a scratch is made or on the vicinity thereof and the "read-after-write" is then executed, information may or may not be reproduced due to the unstable amplitude of the reproduced signal. When information is reproduced, the information interchange process will not be performed even if it has been improperly written, then later information reproduction would not probably be possible.

SUMMARY OF THE INVENTION

It is therefore an object of the present invention to provide a reliable optical disk apparatus which can prevent information from being recorded on a portion containing foreign matter, a scratched portion or on the vicinity thereof from being erroneously recognized in the read-after-write process and thus hinder the information interchange process from being executed.

According to this invention, there is provided an optical disk apparatus comprising an information generating circuit for inserting a RESYNC code in information to be recorded and generating to-be-recorded information, an optical disk driver for recording the to-be-recorded information generated by the information generating circuit on a predetermined area on a recording medium, and for reproducing the information recorded on the predetermined area on the recording medium, a detecting circuit for detecting the RESYNC code in the information reproduced, a counting circuit for counting the RESYNC code detected by the detecting circuit, and an information interchange processing circuit for rerecording the information recorded on an interchange area when the number of the RESYNC codes is equal to or less than a predetermined value.

According to the present invention, a RESYNC code is inserted in information to be recorded, this RESYNC code is counted at the time of reproducing the information, and an information interchange process is executed when the count becomes equal to or less than a predetermined value. This feature permits the information interchange process to be performed not only when an error ratio becomes equal to or greater than a predetermined value as in the conventional case but also when the number of the RESYNC codes becomes equal to or less than a predetermined value, thus improving the reliability of data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a flowchart for explaining the operation of the optical disk apparatus.

DETAILED DESCRIPTION OF THE PREFERRED EMBODIMENTS

Figure 1:
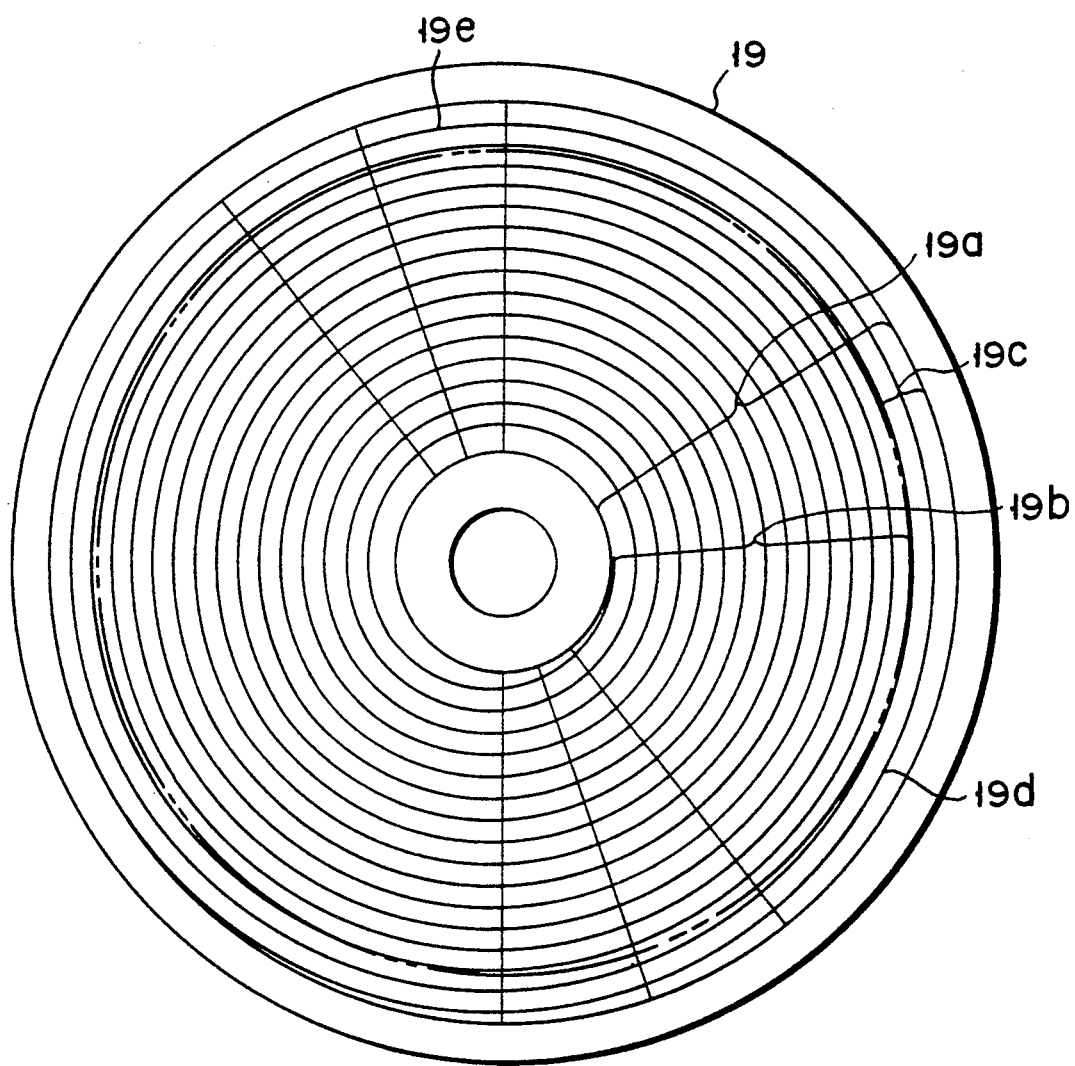
FIG. 1 is a plan view of an optical disk.

Referring to FIG. 1, an optical disk 19 serving as data recording medium for use in an optical disk apparatus, has a recording area 19a formed by coating a metal coating layer of tellurium or bismuth on the surface of a disk-shaped substrate made of, for example, glass or plastic. The recording area 19a includes a main memory area 19b as a user area and an interchange recording area 19c provided at the peripheral portion of the recording area 19a.

Figure 2:
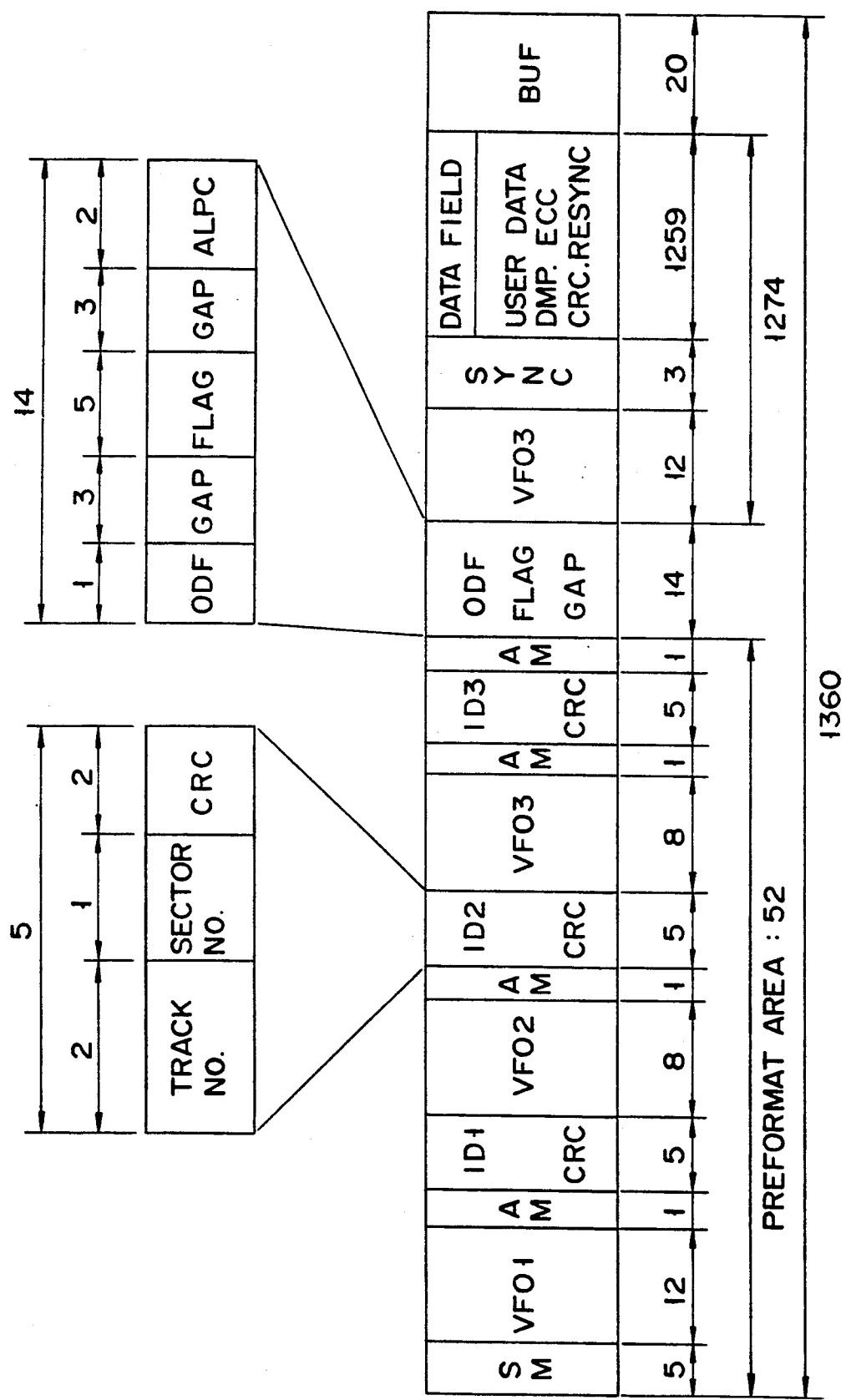
FIG. 2 is a diagram for explaining a sector format.

On the optical disk 19 are information-recording tracks 19d formed in concentrically or in a spiral form. User data can be recorded on the tracks in units of sectors. FIG. 2 illustrates the format of each sector 19e on the optical disk 19. This format conforms to the standards of the ISO (Internal Organization for Standardization) of 1990.

In the format shown in FIG. 2, a 52-byte preformat area is for recording predetermined data at the time of manufacturing optical disks. SM is a sector mark where a special pattern indicating the beginning of a sector is recorded. Areas VFO1, VFO2 and VFO3 are used to store PLL control data. In an area AM is an address mark recorded. The track number and sector number of the associated sector are recorded in areas ID1, ID2 and ID3. CRC is a check code of ID1, ID2 and ID3. Data recording/reproduction to the optical disk 19 is managed by the track number and sector number. ODF is an offset detection flag which is used to detect a focus offset. FLAG is used to display a block in which data has been recorded. GAP is an unrecorded area or a gap. ALPC is an area used for automatic laser power control. SYNC is a sync code affixed to the head of data. A data field follows the SYNC.

The data field consists of 1259 bytes in total: user data of 1024 bytes and other data, such as ECC (Error Correction Code) are recorded in the data field.

Figure 3:
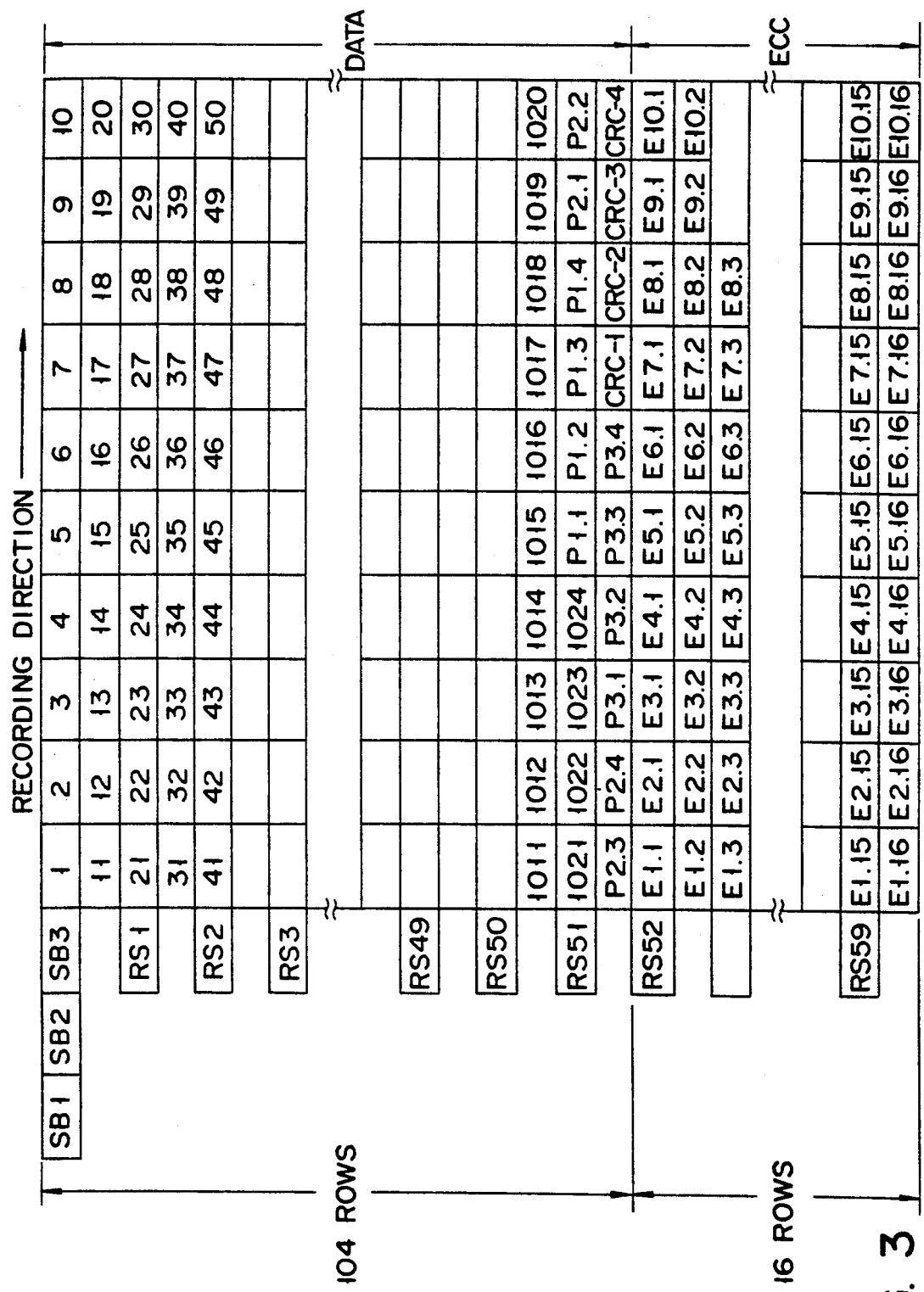
FIG. 3 is a diagram illustrating the format of a data field.

The detailed format of the data field is illustrated in FIG. 3. This format is used in a case when 10-way interleaving including the ECC is executed: a 3-byte sync code SYNC (SB1, SB2, SB3) is provided at the head and a resync code RESYNC (RS1-RS59) is provided for every 20 bytes. The SYNC code is used to detect the timing for the head of data at the reproduction time, whereas the RESYNC code is used to compensate for a sync offset of data occurring during reproduction. Referring again to FIG. 3, P is a pointer indicating a defective portion, CRC is a check code and E indicates an ECC. The illustrated format is for one sector.

An optical disk apparatus embodying the present invention will be described below with reference to FIG. 4.

Figure 4:
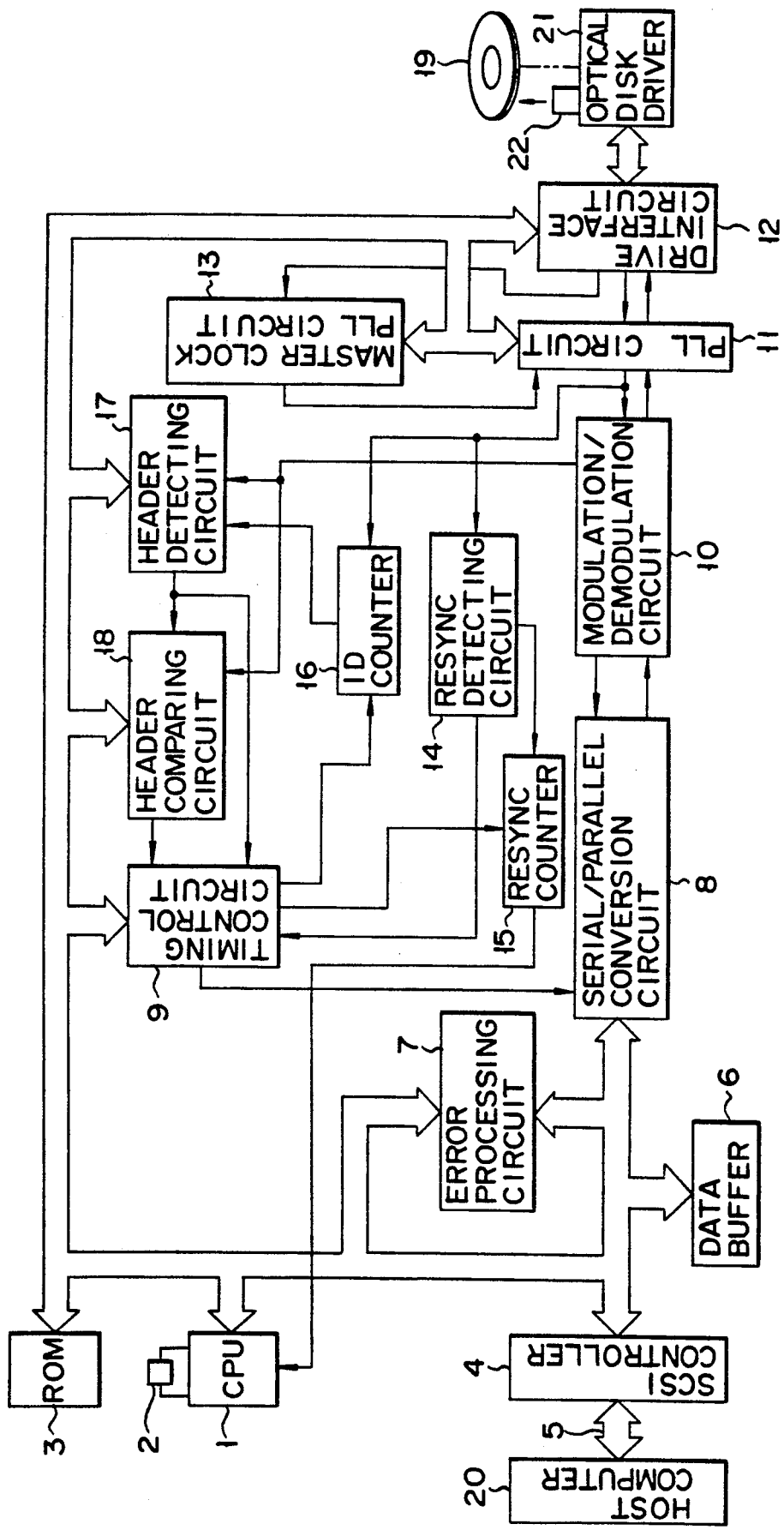
FIG. 4 is a block circuit diagram of a control section of an optical disk apparatus.

Referring to FIG. 4, a CPU 1 serving to perform the general control of the optical disk apparatus has an oscillator 2 and operates at an inherent timing. A program for operating the CPU 1 is stored in a ROM (Read Only Memory) 3.

A SCSI controller 4 is provided to execute data exchange with a host device, such as a host computer, 20 via a SCSI bus 5. A data buffer 6 temporarily stores data sent via the SCSI controller 4 from the host computer 20 or data to be sent via the SCSI controller 4 to the host computer. This data buffer 6 also serves as a working memory for an error processing circuit 7.

The error processing circuit 7 checks the validity of data input from the host computer 20 and to generate an ECC that is affixed to data to be sent to an optical disk driver 21, a RESYNC code and other control codes.

A serial-to-parallel converting circuit 8 converts parallel data stored in the data buffer 6 into serial data before sending it to a modulating/demodulating circuit 10, and converts serial data from this circuit 10 into parallel data and stores it in the data buffer 6 in synchronism with a timing signal from a timing controller 9. The modulating/demodulating circuit 10 performs, for example, 2-to-7 code modulation on serial data sent from the serial-to-parallel converting circuit 8 before sending it to a PLL (Phased Locked Loop) circuit 11, and demodulates data from the PLL circuit 11 before sending it to the circuit 8. The output signal of the modulating/demodulating circuit 10 is also supplied to a header detecting circuit 17 and a header comparator 18.

The PLL circuit 11 outputs data sent from the modulating/demodulating circuit 10 to a drive interface circuit 12 in synchronism with a predetermined clock, and outputs data from the drive interface circuit 1 to the modulating/demodulating circuit 10 in synchronism with a clock signal from a master clock PLL circuit 13. The PLL circuit 13 serves as a clock generating circuit to generate a clock from a serial data included in a reproduced digital modulation signal. The clock separated by the PLL circuit 13 is supplied to the PLL circuit 11 and is used as a clock for a reproduction signal.

The drive interface circuit 12 serves to control data exchange between a control section including elements 1 to 18 and the aforementioned optical disk driver 21, and sends and receives serial data.

A RESYNC detecting circuit 14 detects a RESYNC code when this code is included in reproduction data output from the PLL circuit 11. Upon detection of the RESYNC code, this detecting circuit 14 outputs a detection signal to the timing controller 9 and a RESYNC counter 15. In response to the detection signal, the timing controller 9 resets a synchronization of reproduction data, and the RESYNC counter 15 counts the RESYNC code and outputs the counting result to the CPU 1. The operation of the RESYNC counter 15 is controlled by a control signal from the timing controller 9. Based on the control signal from the timing controller 9, this ID counter 16 counts ID and outputs the result to the header detecting circuit 17. The detecting circuit 17 acknowledges that input data is a header portion, from count data acquired by the ID counter 16 counting three identifications ID1, ID2 and ID3, and outputs a header detection signal to the header comparator 18. The header detection signal of the header detecting circuit 17 is also supplied to the timing controller 9. Upon reception of the detection signal from the header detecting circuit 17, the comparator 18 compares header information stored in the CPU 1 with reproduction data output from the modulating/demodulating circuit 10, and outputs the comparison result to the timing controller 9. When the header information coincides with the reproduction data, the timing controller 9 outputs a timing signal to the serial-to-parallel converting circuit 8. The circuit 8 converts the reproduction data from serial-to-parallel in response to the timing signal.

Referring to the flowchart shown in FIG. 5, the recording operation of the thus constituted optical disk apparatus involving an information interchange process will be described below.

In recording data on an optical disk, the data is first input to the SCSI controller 4 from the host computer 20, and is set in the data buffer 6 (Step 1). Then, the validity of data stored in the data buffer 6 is checked by the error processing circuit 7 and an ECC or the like is generated by the circuit 7, thus arranging the data in the format as shown in FIG. 3. Then, the data is written (step S2). In other words, the data, formatted as shown in FIG. 3, is converted into serial data by the serial-to-parallel converting circuit 8, and is sent to the modulating/demodulating circuit 10. The serial data is modulated to be a 2-to-7 code, for example, by the modulating/demodulating circuit 10, and is supplied to the PLL circuit 11. The data synchronized with a predetermined transfer clock by the PLL circuit 11, is transferred through the drive interface circuit 12 to the optical disk driver 21. The optical disk driver 21 then writes the data on the optical disk 19 through the optical head 22.

Then, the data written in Step 2 is read, i.e., the read-after-write operation is executed (step 3). The data read out from the optical disk 19 is sent to the PLL circuit 11 through the optical disk driver 21 and the drive interface circuit 12. Meantime, a clock signal is separated from the data given through the drive interface circuit 12 to the master clock PLL circuit 13, and is used as a reproduction clock in the PLL circuit 11. The data, sent from the PLL circuit 11 in synchronism with the reproduction clock, is demodulated in the modulating-/demodulating circuit 10 and, is then converted into parallel data in the serial-to-parallel converting circuit 8. The parallel data is sequentially stored in the data buffer 6.

In parallel with the aforementioned process, the data output from the PLL circuit 11 is supplied to the RESYNC detecting circuit 14. When a RESYNC code is detected, the RESYNC code is counted by the RESYNC counter 15.

Upon completion of reading a series of data as described above, an error ratio is checked (step 4). In other words, the error ratio of the data latched in the data buffer 6 to the previously written data is computed, and it is judged whether or not the error ratio is equal to or smaller than a predetermined value determined by the system. At this time, the detection of the presence of absence of an error is executed using the ECC affixed as a redundant code.

If the error ratio is discriminated to be equal to or less than the predetermined value in the above-described step S4, the content of the RESYNC counter 15, is read out and it is judged whether or not the count value is equal to or less than a predetermined value, e.g., 57 (step S5). If the count value is greater than the predetermined value, the number of the RESYNC codes is considered normal and the recording operation is properly terminated. On the other hand, if the number of the RESYNC codes is equal to or less than 57, the operation branches to step S8 where an information interchange process is performed.

If the error ratio is judged to be greater than the predetermined value, the operation also advances to step S8 to execute the information interchange process.

The information interchange process is executed by performing recording and reading or read-after-write again with respect to an area on the optical disk other than the user area, e.g., the interchange area 19c provided at the outermost track on the optical disk. In this case, first, data is rewritten in the interchange block (step S8). The writing procedure is the same as done in step S2.

Then, reading of the data written in step S8 or the read-after-write is executed (step s9). In this case, as in step S4, the error ratio of the data latched in the data buffer 6 to the previously written data is computed and it is determined whether or not the error ratio is equal to or less than a predetermined value (step S10). If the error ratio is equal to or below the predetermined value, the content of the RESYNC counter 15 is read out and it is determined whether or not the count value is equal to or less than a predetermined value, e.g., 57 (step S11). If the count value is greater than the predetermined value, the number of the RESYNC codes is considered normal and the recording operation is properly terminated. On the other hand, if the number of the RESYNC codes is equal to or less than 57, the operation advances to step S6 where the content of a retry counter (not shown) provided in the CPU 1 is decremented. If the error ratio is judged to be greater than the predetermined value in step S10, the operation also advances to step S6 to decrement the content of the retry counter.

Then, it is discriminated whether or not the value of the retry counter becomes a predetermined value (step S7). If this value is not the predetermined value, the operation also advances to step S8 to re-execute the read-after-write (steps S8-S11). When the above operation is repeated and it is determined that the retry number has reached the value determined by the system (step S7), it is discriminated that a defect also exists in the interchange area. The optical disk apparatus considers it as presence of an error, terminates the operation, and reports the event to an operator to terminate the sequence of processes.

The present invention has been devised, paying an attention to the fact that an event of no information interchange process being executed when data is recorded on a portion where a foreign matter sticks on the surface of an optical disk or a scratch is made, disabling later reproduction is likely to occur when sticking of a foreign matter is relatively light and only the RESYNC cannot consecutively be read out propery. In other words, if the RESYNC, which is provided to compensate for a synchronization offset occurring during reproduction, cannot be detected, an synchronization offset is likely to occur and data may be erroneously reproduced. If one RESYNC is not detected but the next RESYNC is detected, error data would amount simply 20 to bytes. If the RESYNC cannot be consecutively detected, the error state continues to hinder data reproduction. As data is recorded in synchronism with a clock at the time of recording, however, data may accidentally be read out without causing a synchronization offset even if the RESYNC is not detected. In this case, the information interchange process is not executed at the time of the read-after-write operation, and disabling of later data reproduction probably occurs.

To avoid such an event, the RESYNC code is recorded in information to be recorded, it is counted at the time of reproducing data, and the information interchange process is executed when the count becomes equal to or greater than a predetermined value. Accordingly, the information interchange process is executed when the number of the RESYNC codes becomes equal to or greater than a predetermined value as well as when the conventional error ratio becomes equal to or greater than a predetermined value, thus providing an optical disk with high data reliability.

Additional advantages and modifications will readily occur to those skilled in the art. Therefore, the invention in its broader aspects is not limited to the specific details, representative devices, and examples shown and described herein. Accordingly, various modifications may be without departing from the spirit or scope of the general inventive concept as defined by the appended claims and their equivalents.

What is claimed is:

1. An optical disk apparatus for optically recording information on and reproducing information from a recording medium having a main memory area and an interchange recording area, comprising:
   information generating means for inserting a plurality of resync codes in information to be recorded to generate record information;
   optical transducing means for performing at least one of optical recording of the record information generated by said information generating means on said main memory area on recording medium and optical reproducing of the record information recorded on said main memory area on said recording medium;
   detecting means for detecting resync codes in the information reproduced by said reproducing means;

counting means for counting the resync codes detected by said detecting means; and control means for executing a read-after-write operation after the record information is written in said recording medium by making said optical transducing means reproduce again the record information recorded in said recording medium, said control means including means for computing an error ratio from data to be written on said recording medium and data read out therefrom, and making said optical transducing means re-record the record information on the interchange recording area on said recording medium in accordance with the number of the resync codes counted by said counting means and the error ratio.

2. The optical disk apparatus according to claim 1, wherein said control means executes an information interchange process when; the error ratio is greater than a predetermined value.

3. The optical disk apparatus according to claim 1, wherein said control means executes an information interchange process when the error ratio is equal to or less than a predetermined value and the number of the resync codes is equal to orless than a predetermined value.

4. The optical disk apparatus according to claim 1, wherein said control means includes a function to count the number of the read-after-write operations executed, a function to decrement a retry count value when the number of the resync codes is equal to or less than a predetermined value or when the error ratio is greater than a predetermined value, and a function to determine whether or not said retry count value becomes a predetermined value and execute the read-after-write operation again when the retry count value is not the predetermined value.

5. The optical disk apparatus according to claim 1, wherein said recording medium is an optical disk having the interchange recording area formed at a peripheral portion thereof.

* * * * *

UNITED STATES PATENT AND TRADEMARK OFFICE
CERTIFICATE OF CORRECTION

PATENT NO. : 5,218,590
DATED : June 08, 1993
INVENTOR(S) : Toshiyuki Miyasaka

It is certified that error appears in the above-indentified patent and that said Letters Patent is hereby corrected as shown below:

Claim 2, column 7, line 18, delete ";" .

Claim 3, column 8, line 3, change "orless" to --or less--.

Signed and Sealed this

Twelfth Day of April, 1994

BRUCE LEHMAN

*Commissioner of Patents and Trademarks*

*Attest:*

*Attesting Officer*